3,585,261
PRODUCING HOT PRESSED FERRITES UTILIZING THORIA AS A PARTING COMPOUND
Paul D. Baba, San Carlos, and Joel E. Zneimer, Belmont, Calif., assignors to Ampex Corporation, Redwood City, Calif.
No Drawing. Filed Sept. 12, 1968, Ser. No. 759,525
Int. Cl. C04b 35/26
U.S. Cl. 264—65                    1 Claim

ABSTRACT OF THE DISCLOSURE

In the prior art hot pressed ferrite articles have been made by cold pressing finely ground ferrite compositions, sintering the cold pressed ferrite shape, surrounding the cooled sintered shape with finely ground zirconia or alumina parting agent in a hot press cavity and hot pressing the sintered ferrite shape to final density. The present invention uses thoria in place of the zirconia or alumina parting agent which eliminates any reaction between the parting agent and the ferrite that would affect the magnetic properties of the ferrite.

SUMMARY OF THE INVENTION

In forming ferrite articles such as toroids, cylinders, bars and the like, it is desirable to provide a very dense single phase article having a uniform grain size. This can be achieved by hot-pressing the ferrite powder. Hot-pressing is the process by which temperature and pressure are applied to a material in one step instead of two separate operations. By combining these operations into one, the individual temperature or pressure required in conventional processing is reduced. The hot-pressing process requires that the die which contains the sample must be able to withstand temperature and pressure.

An added requirement is that the die material should not react with the magnetic oxide and destroy the magnetic characteristics of the material or ruin the die. In order to prevent this reaction, a common practice is to separate the magnetic oxide from the die with alumina oxide ($Al_2O_3$) or zirconia oxide ($ZrO_2$) powder. It has been found, however, that although these materials do protect the die, they react with the magnetic oxides and alter the magnetic properties of the ferrite.

The present invention provides a material which has a sufficient cation-anion bonding strength so that it is not broken down easily during the hot-pressing process. A further consideration is that the cation is too large to enter the magnetic oxide crystal lattice and thus reactively be eliminated.

In accordance with the present invention, thoria ($ThO_2$) is employed as a parting compound. It is of a sufficient refractory nature to protect the die, and sample removal is easy. It gives no indication of reacting with the ferrite and affecting the magnetic properties. Thus, employment of $ThO_2$ as a separation medium between the magnetic oxide and the die parts during the hot-pressing process results in an improved product.

DESCRIPTION OF THE PREFERRED EMBODIMENTS

The following non-limiting examples illustrate preferred embodiments of the invention:

EXAMPLE I

A mixture of the following oxides was weighed out:

EXAMPLE 1

|  | Percent by wt. | Percent by mole |
|---|---|---|
| $Fe_2O_3$ | 68 | 52 |
| ZnO | 12 | 18 |
| MnO | 20 | 30 |

The mixture of oxides was then ball milled for several hours to provide a homogeneous mixture. The mixture was then prefired at a temperature of 1050° C. in an atmosphere of air for four hours. The mixture was cooled and then again ball milled and screened. The mixture was then pressed into the form of a cylinder in a die. The cylinder was removed from the die and was then sintered at a temperature of 1200° C. in an atmoshpere of nitrogen for 2 hours. The cylinder was then cooled. A die was prepared by first placing a small amount of thoria powder in the die. The cylinder was then placed in the die and more thoria powder was placed around the cylinder and over the top of the cylinder, completely surrounding the cylinder and isolating it from the die and plunger. A pressure of 6000 lbs. per sq. in. was applied to the die and it was heated to a temperature of 1100° C. for 3 hours. The die was then cooled and the cylinder removed. It was found that there had been no sticking of the cylinder to the die and that there was no reaction of the thoria with the ferrite.

EXAMPLE II

The process of Example I was repeated but with an initial starting mixture as follows:

|  | Percent by weight |
|---|---|
| $Fe_2O_3$ | 57 |
| $Li_2CO_3$ | 15.15 |
| $TiO_2$ | 27.5 |

There was no sticking of the ferrite to the die and no evidence of reaction between thoria and the ferrite.

EXAMPLE III

Similar results were obtained with the following composition:

|  | Percent by weight |
|---|---|
| $Fe_2O_3$ | 67.0 |
| NiO | 10.0 |
| ZnO | 19.0 |
| CuO | 4.0 |

We claim:
1. In the process of forming a sintered ferrite article wherein a ferrite mixture is first pressed to form an article is sintered and is then subjected to a hot pressing operation in a heated die wherein a powder is employed as a parting compound between the die and the ferrite article, the improvement comprising employing thoria powder as the powder parting compound to eliminate reactions between said powder and said sintered article that affect the magnetic properties of said sintered ferrite articles.

(References on following page)

References Cited

UNITED STATES PATENTS

| | | | |
|---|---|---|---|
| 2,990,602 | 7/1961 | Brandmayr et al. | 264—337 |
| 3,189,550 | 6/1965 | Malinofsky | 264—56 |
| 3,197,412 | 7/1965 | Gyorgy et al. | 264—65 |
| 3,213,491 | 10/1961 | Craig | 264—337 |
| 3,274,110 | 9/1966 | Getto | 264—65 |
| 3,297,576 | 1/1967 | Van Driel | 264—65 |
| 3,343,915 | 9/1967 | Rossi et al. | 264—332 |
| 3,383,737 | 5/1968 | Greger | 264—332 |
| 3,448,184 | 6/1969 | Moss et al. | 264—338 |
| 3,456,048 | 7/1969 | Brandmayr | 264—65 |

DONALD J. ARNOLD, Primary Examiner

J. H. MILLER, Assistant Examiner

U.S. Cl. X.R.

264—66, 125, 332, 337, 338